United States Patent
Daniels et al.

(10) Patent No.: US 10,940,691 B2
(45) Date of Patent: Mar. 9, 2021

(54) SYSTEM AND METHOD FOR ATTENUATING INK WEEPING AND AIR INGESTION IN A PRINTHEAD MOVED BY AN ARTICULATING ARM

(71) Applicant: Xerox Corporation, Norwalk, CT (US)

(72) Inventors: Marc D. Daniels, Webster, NY (US); Husein Naser Rashed, Webster, NY (US); Roger G. Leighton, Hilton, NY (US); Kelly J. Burton, Chicago, IL (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/268,777

(22) Filed: Feb. 6, 2019

(65) Prior Publication Data
US 2020/0247158 A1    Aug. 6, 2020

(51) Int. Cl.
*B41J 2/175*    (2006.01)
*B25J 9/16*    (2006.01)
*B41J 3/407*    (2006.01)
*B41J 25/308*    (2006.01)

(52) U.S. Cl.
CPC .............. *B41J 2/175* (2013.01); *B25J 9/16* (2013.01); *B41J 3/4073* (2013.01); *B41J 25/308* (2013.01)

(58) Field of Classification Search
CPC .................................................. B41J 3/4073
See application file for complete search history.

(56) References Cited

U.S. PATENT DOCUMENTS

| | | | |
|---|---|---|---|
| 5,023,625 A | 6/1991 | Bares et al. | |
| 6,062,678 A * | 5/2000 | Ishinaga | B41J 2/1404 347/48 |
| 7,040,729 B2 | 5/2006 | Richards | |
| 2005/0078144 A1* | 4/2005 | Yamada | B41J 2/16532 347/30 |
| 2014/0327718 A1* | 11/2014 | Kubo | H02M 1/00 347/19 |
| 2017/0087850 A1 | 3/2017 | Kerpe et al. | |
| 2018/0056670 A1* | 3/2018 | Kerr | B41J 3/4073 |
| 2019/0151882 A1* | 5/2019 | Tritt | B25J 9/1666 |
| 2019/0210373 A1* | 7/2019 | Eilers | B41J 2/16508 |

FOREIGN PATENT DOCUMENTS

| | | |
|---|---|---|
| CN | 104494150 A | 4/2015 |
| KR | 101397307 B1 | 5/2014 |
| WO | JP 2015129733 A1 | 3/2017 |

* cited by examiner

*Primary Examiner* — Shelby L Fidler
(74) *Attorney, Agent, or Firm* — Maginot Moore & Beck LLP

(57) ABSTRACT

An inkjet printer adjusts operation of a vacuum system coupled to a printhead to compensate for pressure changes in the manifold of the printhead caused by vertical displacement of the printhead within the printer. The inkjet printer includes a controller that determines either a difference between an optimal pressure in the manifold and a current pressure to operate a vacuum coupled to the manifold for pressure adjustment or it correlates a current printhead vertical position to a previously observed vertical position and uses a vacuum value associated with the previously observed vertical position to operate the vacuum.

21 Claims, 5 Drawing Sheets

SYSTEM AND METHOD FOR ATTENUATING INK WEEPING AND AIR INGESTION IN A PRINTHEAD MOVED BY AN ARTICULATING ARM

TECHNICAL FIELD

This disclosure relates generally to devices that produce ink images by ejecting ink drops from printheads, and more particularly, to devices that eject ink drops from printheads that maneuver through three-dimensional space.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead controller. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

For quality printing, the pressure of the ink in a printhead must be adjusted to properly set the ink meniscus within the nozzles of the inkjets in the printhead. For static printhead configurations, this adjustment is typically done infrequently because the printhead is fixedly mounted to a frame or other stable structure and an ink delivery system delivers ink to the printhead at a relatively steady pressure. The delivery pressure is regulated by a controller that monitors pressure within an ink supply that supplies one or more printheads and when the pressure needs adjusting, the controller vents the ink supply to ambient pressure or applies pressure from a positive pressure source. The pressure within a printhead is adjusted from time to time during printer maintenance by manually operating a vacuum pressure valve to draw the free surface of the ink toward the manifold of the printhead.

Printers have been developed that move a printhead along a vertical member to enable the printhead to form ink images on an array of objects positioned opposite the vertical member. This system configuration conserves space and enables the printer to be placed within a retail environment so objects can be custom printed as they are purchased. The vertical excursion of the printhead can be problematic because the changes in height between the printhead and the ink supply located at a fixed location cause hydrostatic pressure changes in the printhead. Failure to compensate for these hydrostatic pressure changes in printheads result in ink weeping from the printhead nozzles when the printhead is moved downwardly or ink to retract into the printhead to an extent that the printhead may ingest air when the printhead is moved upwardly. Addressing the effects caused by hydrostatic pressure changes in vertically moving printheads would be useful.

SUMMARY

A method of inkjet printer operation enables the ink meniscus at the nozzles of a printhead to remain at a position that inhibits ink weeping and air ingestion. The method includes moving a printhead vertically in a three-dimensional space, and operating with a controller a vacuum source operatively connected to the printhead to adjust an ink pressure within the printhead to compensate for ink pressure changes in the printhead arising from vertical displacement of the printhead within the three-dimensional space.

An inkjet printer implements the method that enables the ink meniscus at the nozzles of a printhead to remain at a position that inhibits ink weeping and air ingestion. The inkjet printer includes a printhead configured for vertical movement in three-dimensional space, a vacuum operatively connected to the printhead, the vacuum being configured to adjust an ink pressure within the printhead, and a controller operatively connected to the vacuum, the controller being configured to operate the vacuum to adjust the ink pressure within the printhead to compensate for ink pressure changes in the printhead arising from vertical displacement of the printhead.

An inkjet printer includes a printhead mounted to an articulated arm to enable the printhead to be maneuvered in three-dimensional space about an object. Such a printer implements the method that enables the ink meniscus at the nozzles of a printhead to remain at a position that inhibits ink weeping and air ingestion as the printhead is maneuvered in three-dimensional space. The inkjet printer includes a printhead, an articulated arm to which the printhead is mounted, the articulated arm having at least one servo that is configured to at least vertically move the printhead, a vacuum operatively connected to the printhead, the vacuum being configured to adjust an ink pressure within the printhead, and a controller operatively connected to the vacuum and the at least one servo in the articulated arm, the controller being configured to operate the servo to move the printhead in three-dimensional space and to operate the vacuum to adjust the ink pressure within the printhead to compensate for ink pressure changes arising from vertical displacement of the printhead by the articulated arm.

BRIEF DESCRIPTION OF THE DRAWINGS

The foregoing aspects and other features of a system and method that enable the ink meniscus at the nozzles of a printhead to remain at a position that inhibits ink weeping and air ingestion are explained in the following description taken in connection with the accompanying drawings.

DETAILED DESCRIPTION

Figure 1:
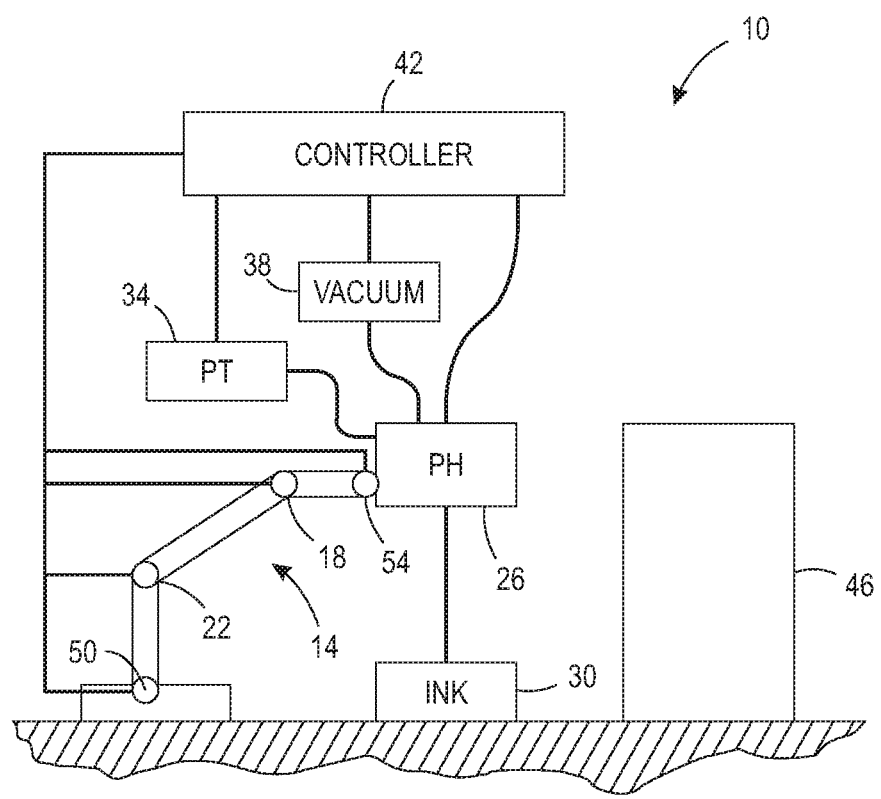
FIG. 1 is a schematic drawing of an inkjet printing system having an articulated arm that moves a printhead through three-dimensional space to print ink images on objects without adverse impacts from hydrostatic changes in the printhead.

For a general understanding of the environment for the system and method disclosed herein as well as the details for the system and method, reference is made to the drawings. In the drawings, like reference numerals have been used throughout to designate like elements. As used herein, the word "printhead" encompasses any apparatus that ejects a marking material to produce ink images on the surfaces of objects.

FIG. 1 illustrates an inkjet printer 10 having an articulated arm 14 that is configured with a printhead 26 to form ink images on the surfaces of objects, such as object 46, located in the vicinity of the printer. The articulated arm 14 can be, for example, a six-axis robotic arm, such as the Epson C4 robotic arm available from Epson America, Inc. of Long Beach, Calif. The articulated arm 14 is configured for movement that enables the printhead to move opposite all of the sides, top, and back of the object 46 but the drawing scale does not comport with this range to simplify the figure. The articulated arm 14 includes servos 18, 22, 50, and 54 that join arm segments to one another and these servos are configured to move the arm segments vertically, horizontally, and combinations of these directions. Additionally, the servo 54 is operated to tilt and rotate the printhead 26 to produce changes in the yaw, roll, and pitch of the printhead. As used in this document, the term "vertical" means a direction of movement that changes the gravitational potential of the component or portion of the component being moved. As used in this document, the term "horizontal" means a direction of movement that maintains the gravitational potential on the component or portion of the component at the gravitational potential it possessed prior to the movement. When the printhead is held at a horizontal position, the longitudinal axis of the printhead face is at a same gravitational potential through the printhead. Three orthogonal axes centered in the printhead then define an X axis that is corresponds to the longitudinal axis, a Y axis that is at the same gravitational potential of the X axis and forms a horizontal plane with the X axis, and a Z axis that is perpendicular to both the X and Y axes and corresponds to a change in the gravitational potential of the printhead or a portion of the printhead. Thus, "yaw" is defined as rotation of the printhead about the Z axis in the X-Y plane, "pitch" is defined as rotation about X axis in the Y-Z plane, and "roll" is defined as Y axis in the X-Z plane. The controller 42 generates signals that operate the servos to move the arm segments of the articulated arm 14 and to tilt and roll the printhead to position the printhead 26 at various locations and orientations opposite the object 46.

In systems where a printhead remains in a horizontal orientation at a predetermined distance above the free surface of the ink in a fixedly mounted ink reservoir, vacuum control is not necessary to maintain an appropriate meniscus in the inkjets of the printhead since the hydrostatic pressure in the printhead remains relatively constant. Where the printhead moves with respect to the level of the ink in the ink reservoir of the ink delivery system 30, which is fixedly mounted with reference to the base of the robotic arm, then more robust control of the meniscus is required.

With further reference to FIG. 1 and the system 10 in which the printhead 26 moves relative to the ink level in the ink reservoir of the ink delivery system 30, a vacuum source 38 is operatively connected to the manifold internal to the printhead 26 or to the head space in the reservoir of the ink delivery system 30 to maintain the negative ink meniscus in the nozzles of printhead 26 while the printhead is being maneuvered through three-dimensional space by the articulated robotic arm 14. The controller 42 operates the vacuum system 38 to keep the pressure within the manifold of the printhead 26 at a predetermined value by using the signal generated by pressure transducer 34. Pressure transducer 34 is configured to generate a signal indicating the ink pressure within the manifold of the printhead 26. The pressure transducer can be mounted to or within the printhead 26 or operatively connected to the manifold by a pneumatic tube or the like.

As the printhead moves, the vacuum level is adjusted for acceleration of the printhead and ink in the supply tubes in any direction that produces hydraulic water hammer to occur within the printhead and for maintaining the meniscus when elevation changes occur. The controller is configured to implement a feed forward control loop that preempts pressure changes by beginning the vacuum control before the printhead movement occurs because the controller is using robotic arm control data to operate the robotic arm so the controller uses the path data and is able to identify the dynamic forces acting on the ink in the supply tubes and printhead so it can operate the vacuum source 38 to reduce the overshoot and lag time in the vacuum control. For example, the controller can select a plurality of positions along the path at predetermined increments of vertical displacement and operate the vacuum using a vacuum value associated with the first selected position and then as the printhead nears that position begin operating the vacuum with another vacuum value associated with a next selected position along the path. This operation of the vacuum continues until the last position in the path is reached.

The controller 42 can be implemented with general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During printing, image data for an image to be produced are sent to the controller 42 from either a scanning system or an online or work station connection for processing and generation of the printhead control signals output to the printhead 26. Other functions performed by the controller 42 to maintain the negative ink meniscus at the printhead are discussed below.

Figure 2:
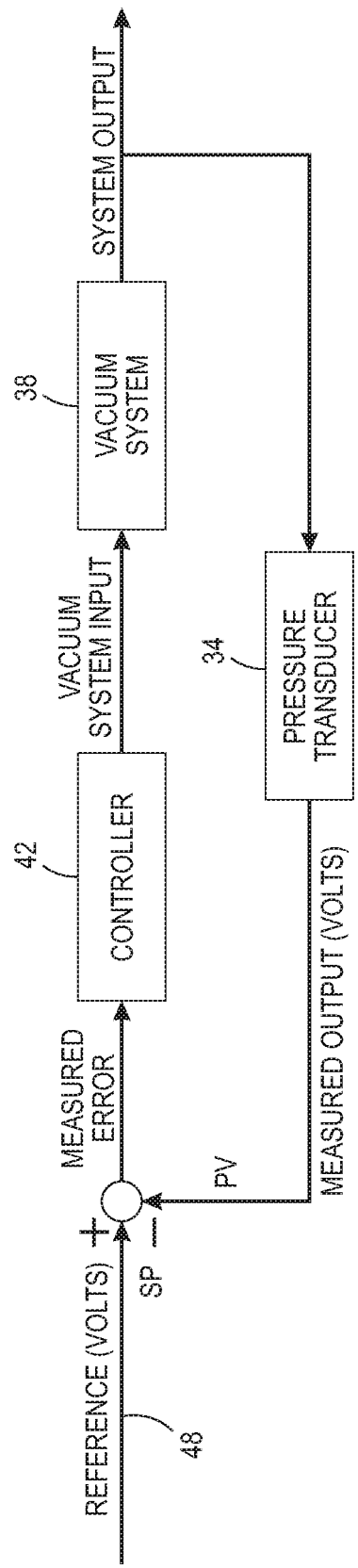
FIG. 2 is a block diagram of a vacuum system regulator used in the printer shown in FIG. 1 to monitor the pressure within the printhead mounted to the articulated arm and adjust the vacuum system maintaining the pressure within the printhead.

A block diagram showing the feedback loop used to operate the vacuum system 38 and regulate the pressure within the manifold of the printhead 26 is shown in FIG. 2. Using like reference numbers for like components, the controller 42 identifies a difference between a set point or reference voltage and the signal received from the pressure transducer 34. This difference indicates a change in the pressure within the manifold of the printhead from the set point or reference voltage. The controller uses this identified difference to operate the vacuum system 38 to regulate the pressure within the manifold of the printhead 26. The pressure transducer 34 generates a signal indicative of the pressure in the manifold of the printhead and the control loop continues.

The set point or reference value is obtained in an empirical manner. Specifically, the vacuum value required to position the ink meniscus at or near the optimal location in the nozzles of the printhead is statically determined by visually inspecting the ink meniscus through the use of a microscope camera at one position of the printhead's movement range. The signal produced by the pressure transducer is then used as the target control set point value (SP) or reference voltage. The reference voltage can be supplied to the controller 42 as a hard-wired input to the controller or the set point can be stored in a memory operatively connected to the controller so the controller can compare a data value corresponding to the signal generated by the pressure transducer to the stored value. Vertical excursions of the printhead that change the height of the printhead with reference to the ink surface in the reservoir of the ink delivery system 30 and cause hydrostatic pressure changes are reflected by the signal generated by the transducer as the controlled process value (PV) as shown in FIG. 2. The controller modifies the vacuum pressure by operating a proportional valve to reduce the SP-PV difference to a value within a predetermined range about zero. Specifically, when the pressure in the printhead increases because the printhead drops, the controller determines the attendant differential increase and increases the vacuum applied to the printhead to reduce the printhead internal pressure. When the pressure in the printhead decreases because the printhead rises, the controller detects the attendant differential decrease and decreases the vacuum applied to the printhead to increase the printhead internal pressure. The vacuum can be produced with a pump, vacuum venturi, or a positive air pressure source.

Figure 3:
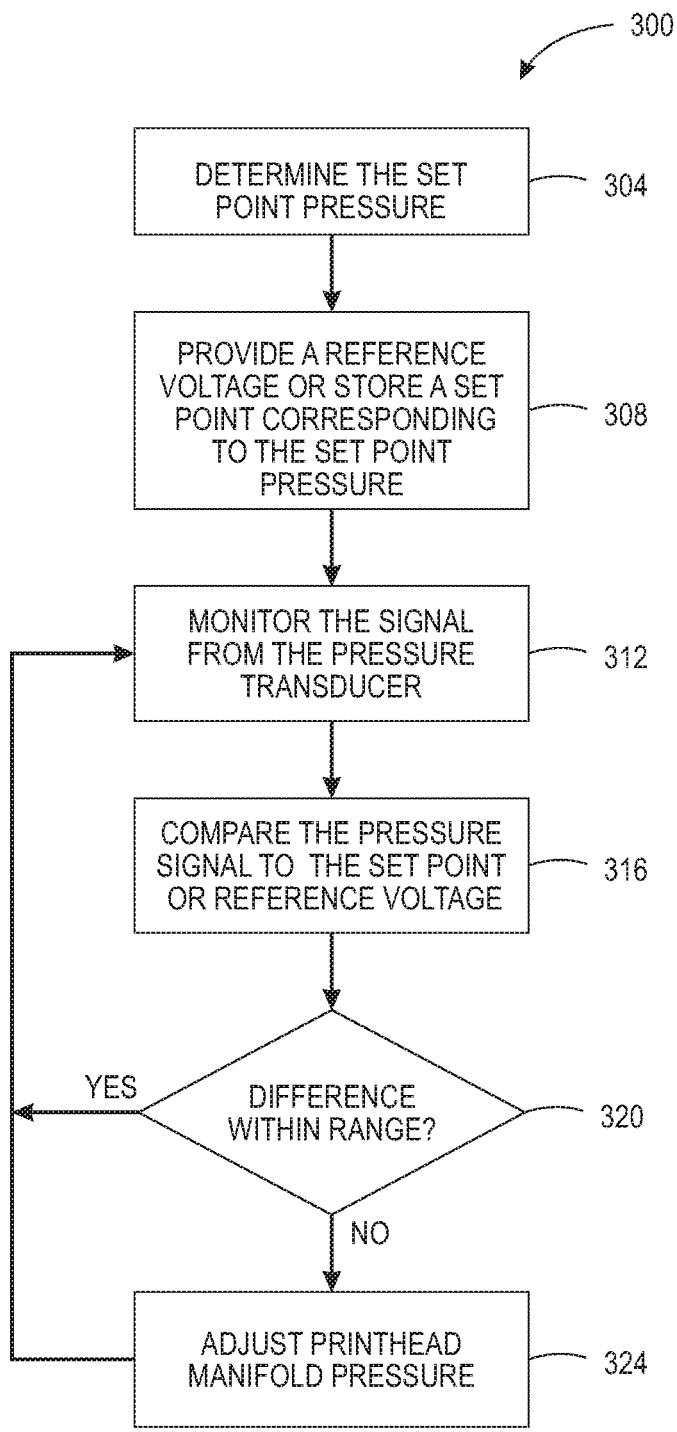
FIG. 3 is a flow diagram of a process for operating the printing system of FIG. 1 by using the vacuum system regulator of FIG. 2 to monitor the pressure within the printhead mounted to the articulated arm and adjust the vacuum system maintaining the pressure within the printhead.

A process for regulating the pressure in the manifold of a printhead mounted to a vertically moving member is shown in FIG. 3. In the discussion below, a reference to the process 300 performing a function or action refers to the operation of a controller, such as controller 42, to execute stored program instructions to perform the function or action in association with other components in the printer. The process 300 is described as being performed by the printer 10 of FIG. 1 for illustrative purposes.

A test setup is used to identify the pressure for the optimal position of the ink meniscus in nozzles of a printhead to be used in a printer that vertically moves the printhead (block 304). This identified pressure is then used to provide a reference voltage to the controller that regulates the pressure within the printhead when it is installed in the printer or to generate a data value that is stored in a memory operatively connected to the controller (block 308). After the printhead 26 is mounted to the articulated arm 14 and the vacuum system 38, ink delivery system 30, and pressure transducer 34 are operatively connected to the printhead, the signal from the pressure transducer 34 is monitored by the controller 42 (block 312) and compared to the reference voltage or stored set point value (block 316). When the difference between the two values is greater than a predetermined range about zero (block 320), the controller 42 adjusts the operation of the vacuum system 38 to bring the pressure in the manifold of the printhead within this predetermined range (block 324). This control loop continues until the printer is taken offline (block 328).

In one embodiment, a range of about −0.5 to −2.5 inches of water pressure is sufficient to maintain the negative ink meniscus in the printhead, although other ranges are used depending upon the configuration and size of the printhead. Printhead parameters can also limit the extent to which a printhead can be yawed, pitched, or rolled. For example, some inkjet printheads have a length of 9.5 inches along the longitudinal axis of the printhead. If this printhead is rolled so one end is directly over the other end of the printhead, then the end of the printhead at the lower gravitational potential leaks ink even though the vacuum is sufficient to maintain the ink meniscus at the other end. Typically, most printheads are not so wide, that is, the distance across the printhead face along the axis that is perpendicular to the longitudinal axis and parallel to the z-axis, that the pitch of the printhead can be extreme enough to cause lower inkjets to leak. Of course, yaw does not vertically displace the inkjets in the printhead so the vacuum levels are relatively constant during yaw movement of the printhead.

Figure 4:
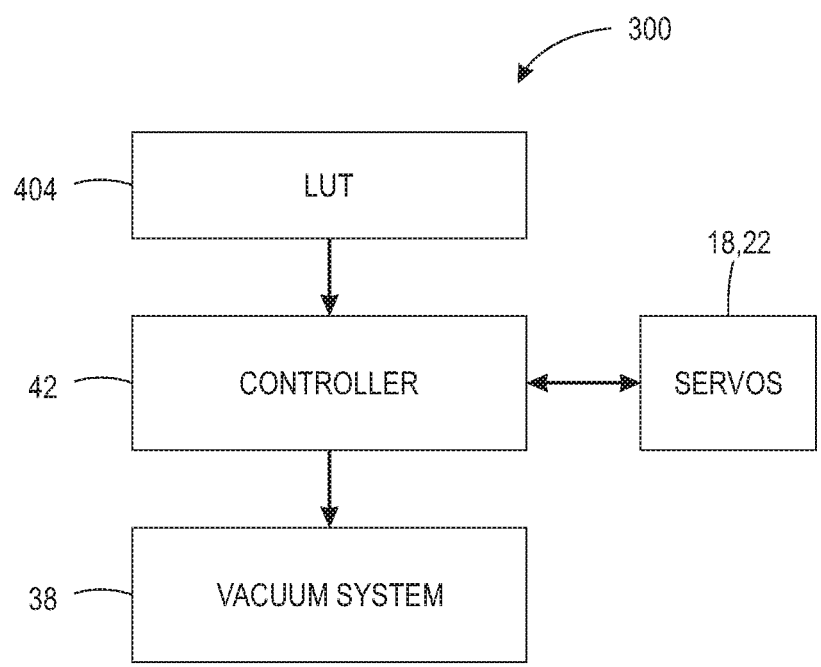
FIG. 4 is a block diagram of a vacuum system regulator used in the printer shown in FIG. 1 to monitor the servo signals used to move the articulated arm and adjust the vacuum system maintaining the pressure within the printhead.

An alternative control scheme can be implemented in the printer 10 of FIG. 1 by using the control loop shown in FIG. 4. Using like reference numbers for like components, the controller 42 identifies a vertical displacement of the printhead from one printhead position to its next position from the commands the controller issues to the servos of the articulated arm 14. This displacement is correlated to a vacuum setting that provides a pressure within the manifold of the printhead at which the ink meniscus is optimally located. The correlation between vertical displacement and vacuum setting is stored in lookup table (LUT) 404. The controller uses the vacuum setting returned by the LUT 404 to operate the vacuum system 38 and regulate the pressure within the manifold of the printhead 26. Thus, the pressure transducer 34 is not required in this embodiment.

The correlations of the pressure and positions are obtained in an empirical manner. Specifically, the vacuum value required to position the ink meniscus at or near the optimal location in the nozzles of the printhead at a plurality of printhead positions over the range of vertical displacement of the printhead by the articulated arm is statically determined by visually inspecting the ink meniscus through the use of a microscope camera at the plurality of positions and recording the vacuum value at each position. As the controller operates the servos to position the printhead, the servo commands are processed to determine the vertical displacement of the printhead. The resulting position of the printhead is correlated to one of the previously observed positions and the corresponding vacuum value is identified. This vacuum value is used by the controller to operate the vacuum system to adjust the pressure in the printhead. Thus, vertical excursions of the printhead that cause hydrostatic pressure changes are correlated to the positions previously observed to identify a vacuum value for operating the vacuum system when the printhead is at or near that position. The controller can extrapolate a vacuum value when the position to which the printhead is moved is between two previously observed positions.

Figure 5:
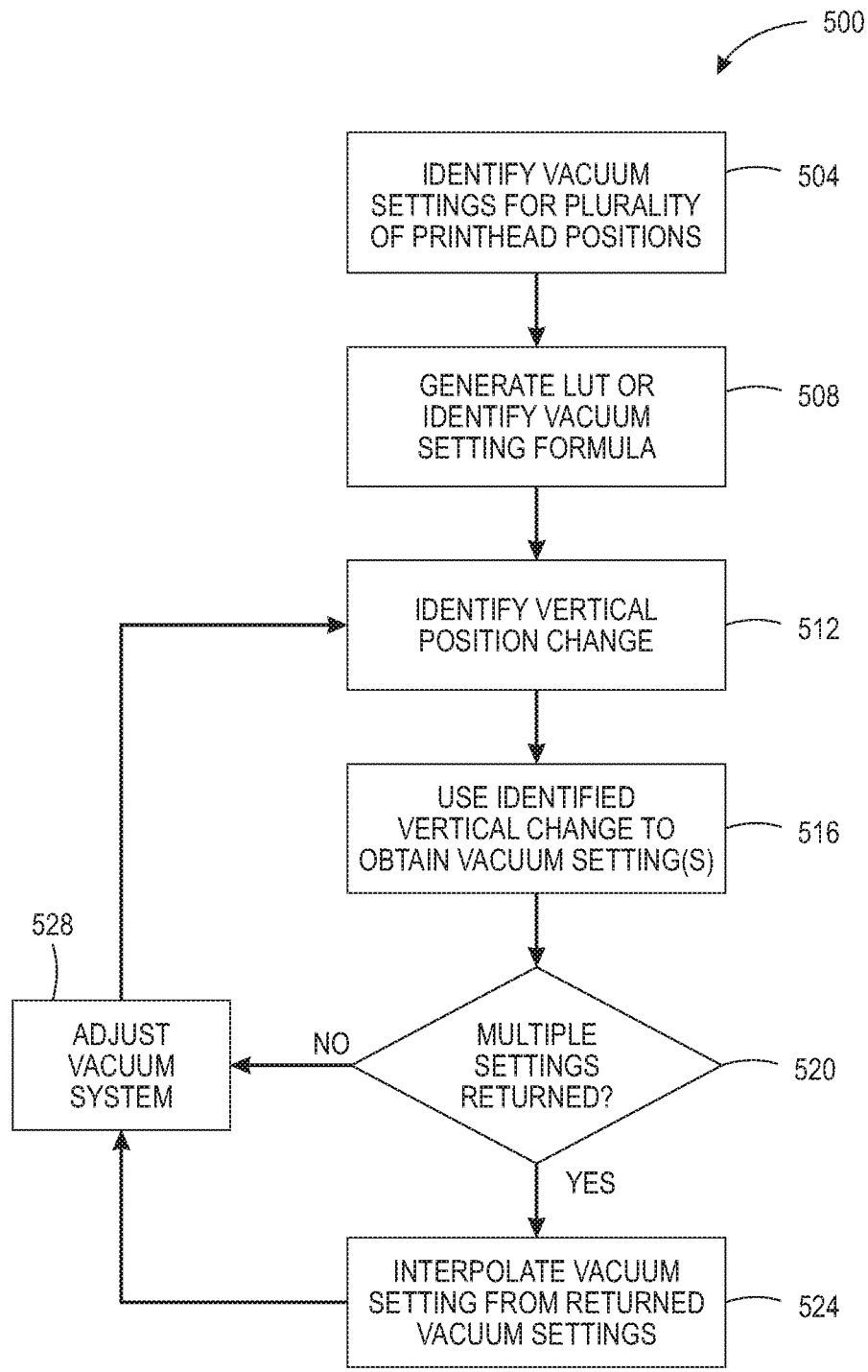
FIG. 5 is a flow diagram of a process for operating the printing system of FIG. 1 by using the vacuum system regulator of FIG. 4 to monitor the servo signals used to move the articulated arm and adjust the vacuum system maintaining the pressure within the printhead.

A process for regulating the pressure in the manifold of a printhead mounted to a vertically moving member using positional data for the printhead is shown in FIG. 5. In the discussion below, a reference to the process 500 performing a function or action refers to the operation of a controller, such as controller 42, to execute stored program instructions to perform the function or action in association with other components in the printer. The process 500 is described as being performed by the printer 10 of FIG. 1 for illustrative purposes.

A test setup is used to observe the ink meniscus at a plurality of positions over the vertical displacement range of the printhead and the vacuum values at each position that enable the ink meniscus to be at or near the optimal position in the nozzles of the printhead is recorded (block 504). This correlation of vertical position and vacuum value is then stored as a lookup table in a memory operatively connected to the controller or used to determine a formula for identifying a vacuum value for a corresponding amount of vertical displacement (block 508). After the printer 10 is put into operation, the controller 42 monitors the servo commands to identify a change in the vertical position of the printhead at a printing position (block 512). The identified position change is used to access the vacuum settings stored in the LUT and the vacuum setting of the closest position is returned (block 516). If multiple vacuum settings are returned because the identified position is approximately equally distant from two positions stored in the memory containing the LUT (block 520), then the vacuum setting is interpolated from the two returned vacuum values (block 524). The identified vacuum value is then used to adjust the operation of the vacuum system 38 (block 528). This control loop continues at each vertical position until the printer is taken offline.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
   a printhead having a manifold and a plurality of nozzles, the manifold and the plurality of nozzles being within the printhead and the manifold being fluidly connected to the plurality of nozzles to supply ink to the plurality of nozzles;
   an reservoir fixedly mounted within the inkjet printer, the reservoir being fluidly and directly connected to the manifold to supply ink to the manifold within the printhead;
   an articulated arm to which the printhead is mounted, the articulated arm having at least one servo that is configured to maneuver the printhead within a three-dimensional space to make elevational changes between ink in the manifold and ink in the reservoir, to change an orientation of the printhead, and to accelerate the printhead at velocities sufficient to produce hydraulic water hammer within the printhead;
   a vacuum operatively connected to the manifold in the printhead, the vacuum being configured to adjust an ink pressure within the printhead;
   a pressure transducer, the pressure transducer being fluidly connected to the manifold in the printhead, the pressure transducer being configured to generate a signal indicative of the ink pressure within the printhead; and
   a controller operatively connected to the pressure transducer, the at least one servo of the articulated arm, and the vacuum, the controller being configured to operate the at least one servo of the articulated arm to maneuver the printhead in the three-dimensional space, to change the orientation of the printhead, and to accelerate the printhead sufficiently to produce hydraulic water hammer within the printhead, identify a difference between the ink pressure indicated by the signal generated by the pressure transducer and a predetermined ink pressure corresponding to an optimal position of an ink meniscus within the plurality of nozzles in the printhead at a predetermined position within the three-dimensional space, and operate the vacuum to adjust the ink pressure within the printhead to compensate for ink pressure changes produced in the printhead by the elevational and orientation changes using the identified difference between the ink pressure indicated by the signal generated by the pressure transducer and the predetermined pressure corresponding to the optimal position of the ink meniscus within the plurality of nozzles in the printhead at the predetermined position within the printer while the controller operates the at least one servo of the articulated arm to maneuver the printhead within the three-dimensional space, to change the orientation of the printhead, and to accelerate the printhead sufficiently to produce hydraulic water hammer within the printhead.

2. The inkjet printer of claim 1 further comprising:
   a reference voltage input to the controller, the reference voltage corresponding to the predetermined ink pressure corresponding to the optimal position of the ink meniscus within the plurality of nozzles in the printhead at the predetermined position within the printer.

3. The inkjet printer of claim 2, the controller being further configured to:
   identify the difference between the ink pressure indicated by the signal generated by the pressure transducer and the predetermined ink pressure corresponding to the optimal position of the ink meniscus within the plurality of nozzles in the printhead at the predetermined position within the printer by comparing the signal generated by the pressure transducer to the reference voltage; and
   adjust operation of the vacuum when the identified difference between the signal from the pressure transducer and the reference voltage is outside a predetermined range.

4. The inkjet printer of claim 1 further comprising:
   a set point value stored in a memory operatively connected to the controller, the set point value corresponding to the predetermined ink pressure corresponding to the optimal position of the ink meniscus within the plurality of nozzles in the printhead at the predetermined position within the printer.

5. The inkjet printer of claim 4, the controller being further configured to:
   identify the difference between the ink pressure indicated by the signal generated by the pressure transducer and the predetermined ink pressure corresponding to the optimal position of the ink meniscus within the plurality of nozzles in the printhead at the predetermined position within the printer by comparing the signal generated by the pressure transducer to the set point; and
   adjust operation of the vacuum when the identified difference is outside a predetermined range.

6. The inkjet printer of claim 5 wherein the predetermined range is centered about zero.

7. A method for operating an inkjet printer comprising:
   operating with a controller at least one servo of an articulated arm to which a printhead is mounted to change an orientation and an elevation of the printhead with respect to an ink reservoir fixedly mounted within the inkjet printer and to accelerate the printhead sufficiently to produce hydraulic water hammer in the printhead;

identifying with the controller a difference between a signal generated by a pressure transducer that corresponds to an ink pressure within the printhead and a predetermined ink pressure corresponding to an optimal position of an ink meniscus within a plurality of nozzles in the printhead at a predetermined position within the inkjet printer; and operating with the controller a vacuum source operatively connected to the printhead to adjust an ink pressure within the printhead using the identified difference to compensate for ink pressure changes in the printhead arising from the orientation changes, the elevational changes, and the acceleration of the printhead.

8. The method of claim 7 further comprising:
providing a reference voltage to the controller, the reference voltage corresponding to the predetermined ink pressure corresponding to the optimal position of the ink meniscus within the plurality of nozzles in the printhead at the predetermined position within the inkjet printer.

9. The method of claim 8, the identification of the difference further comprising:
comparing the signal generated by the pressure transducer to the reference voltage to identify a difference between the two signals; and
adjusting operation of the vacuum when the identified difference between the signal from the pressure transducer and the reference voltage is outside a predetermined range.

10. The method of claim 7 further comprising:
storing a set point value in a memory operatively connected to the controller, the set point value corresponding to the predetermined ink pressure corresponding to the optimal position of the ink meniscus within the plurality of nozzles in the printhead at the predetermined position within the inkjet printer.

11. The method of claim 10, the identification of the difference further comprising:
comparing the signal generated by the pressure transducer to the set point value to identify a difference between the signal and the set point value; and
adjusting operation of the vacuum when the identified difference between the signal and the set point value is outside a predetermined range.

12. The method of claim 11 wherein the predetermined range is centered about zero.

13. An inkjet printer comprising:
a printhead having a plurality of nozzles;
an ink reservoir fixedly mounted within the inkjet printer, the ink reservoir being fluidly connected to the printhead to supply ink to the plurality of nozzles in the printhead;
an articulated arm to which the printhead is mounted, the articulated arm having at least one servo that is configured to change an elevation of the printhead with respect to an ink level in the ink reservoir and to accelerate the printhead sufficiently to produce hydraulic water hammer, within the printhead and operate at least one other servo that is configured to change an orientation of the printhead in three independent directions;
a pressure transducer, the pressure transducer being fluidly connected to the printhead, the pressure transducer being configured to generate a signal indicative of an ink pressure in the printhead;

a vacuum operatively connected to the printhead, the vacuum being configured to adjust the ink pressure within the printhead; and
a controller operatively connected to the vacuum, the pressure transducer, the at least one servo and the at least one other servo in the articulated arm, the controller being configured to operate the at least one servo to change the elevation of the printhead with respect to the ink level in the ink reservoir and to accelerate the printhead sufficiently to produce hydraulic water hammer within the printhead, to operate the at least one other servo of the articulated arm to yaw, roll, and pitch the printhead to change the orientation of the printhead within the inkjet printer, and to operate the vacuum to adjust the ink pressure within the printhead to compensate for ink pressure changes arising from elevational changes, orientation changes, and acceleration of the printhead by the articulated arm by identifying a difference between the ink pressure corresponding to the signal generated by the pressure transducer and a predetermined ink pressure corresponding to an optimal position of an ink meniscus within the plurality of nozzles in the printhead at a predetermined position within the inkjet printer.

14. The inkjet printer of claim 13, the controller being further configured to:
select a plurality of positions along a path that the controller operates the articulated arm to move the printhead;
identify a vacuum value for each position in the plurality of positions;
operate the vacuum using a vacuum value associated with a first selected position along the path until the printhead reaches the first selected position; and
operate the vacuum using a vacuum value associated with a next selected position along the path until the printhead reaches the next selected position.

15. The inkjet printer of claim 14, the controller being further configured to:
continue to transition to a vacuum value associated with a next selected position along the path for vacuum operation as each selected position in the plurality of positions is reached; and
operating the vacuum with a vacuum value associated with a last selected position in the plurality of positions until another path is selected for movement of the printhead.

16. The inkjet printer of claim 15, the controller being further configured to:
extrapolate a vacuum value for operating the vacuum from two vacuum values associated with two closest previously identified vertical positions that are equidistant from the identified vertical position of the printhead.

17. The inkjet printer of claim 13 further comprising:
a reference voltage input to the controller, the reference voltage corresponding to the predetermined ink pressure corresponding to the optimal position of the ink meniscus within the plurality of nozzles in the printhead at the predetermined position within the inkjet printer.

18. The inkjet printer of claim 17, the controller being further configured to identify the difference between the ink pressure and the predetermined ink pressure corresponding to the optimal position of the ink meniscus within the plurality of nozzles in the printhead at the predetermined position within the inkjet printer by:

comparing the signal generated by the pressure transducer to the reference voltage to identify a difference between the two signals; and adjusting operation of the vacuum when the identified difference between the signal from the pressure transducer and the reference voltage is outside a predetermined range.

19. The inkjet printer of claim 13 further comprising:

a set point value stored in a memory operatively connected to the controller, the set point value corresponding to the predetermined ink pressure corresponding to the optimal position of the ink meniscus within the plurality of nozzles in the printhead at the predetermined position within the inkjet printer.

20. The inkjet printer of claim 19, the controller being further configured to identify the difference between the ink pressure and the predetermined ink pressure corresponding to the optimal position of the ink meniscus within the plurality of nozzles in the printhead at the predetermined position within the inkjet printer by:

comparing the signal generated by the pressure transducer to the set point value to identify a difference between the signal and the set point value; and adjusting operation of the vacuum when the identified difference is outside a predetermined range.

21. The inkjet printer of claim 20 wherein the predetermined range is centered about zero.

* * * * *